US 6,361,250 B1

(12) United States Patent
de Varax (10) Patent No.: US 6,361,250 B1
(45) Date of Patent: Mar. 26, 2002

(54) DEVICE AND METHOD FOR INSTALLING PIPES AT VERY GREAT DEPTHS (75) Inventor: Hervé de Varax, Paris (FR)

(73) Assignee: Coflexip, Paris (FR)

( * ) Notice: Subject to any disclaimer, the term of this patent is extended or adjusted under 35 U.S.C. 154(b) by 0 days.

(21) Appl. No.: 09/581,648
(22) PCT Filed: Dec. 7, 1998
(86) PCT No.: PCT/FR98/02642
  § 371 Date: Jun. 15, 2000
  § 102(e) Date: Jun. 15, 2000
(87) PCT Pub. No.: WO99/35429
  PCT Pub. Date: Jul. 15, 1999

(30) Foreign Application Priority Data

Jan. 9, 1998 (FR) ............................................. 98 00148

(51) Int. Cl.⁷ .................................................. F16L 1/19
(52) U.S. Cl. .................. 405/158; 405/168.3; 405/168.4
(58) Field of Search .......................... 405/168.1, 168.3, 405/168.4, 158, 166

(56) References Cited

U.S. PATENT DOCUMENTS

| 3,680,322 A | * | 8/1972 | Nolan, Jr. et al. ........... 405/166 |
| 4,068,490 A | * | 1/1978 | Jegousse .................... 405/166 |
| 4,257,718 A | * | 3/1981 | Rosa et al. ................. 405/166 |
| 4,345,855 A | * | 8/1982 | Uyeda et al. ............... 405/166 |
| 4,486,123 A | * | 12/1984 | Koch et al. ................. 405/166 |
| 5,421,675 A | * | 6/1995 | Brown et al. ............... 405/166 |
| 5,464,307 A | | 11/1995 | Wilkins ....................... 405/166 |
| 5,527,134 A | * | 6/1996 | Recalde ..................... 405/168.3 |
| 5,533,834 A | * | 7/1996 | Recalde ..................... 405/168.3 |
| 5,630,678 A | * | 5/1997 | Branchut et al. ........... 405/166 |
| 5,971,666 A | * | 10/1999 | Martin et al. ............. 405/168.1 |
| 5,975,802 A | * | 11/1999 | Willis ....................... 405/166 |

FOREIGN PATENT DOCUMENTS

| FR | 2660402 | 10/1991 | |
| GB | 2025566 | 1/1980 | |
| GB | 2204106 A | * 3/1987 | ............. F16L/1/00 |
| GB | 2287518 | 9/1995 | |
| GB | 2296956 | 7/1996 | |

OTHER PUBLICATIONS

"Specification for Unbonded Flexible Pipe", *American Petroleum Institute*, API Specification 17J, First Edition: Dec. 1996, Effective Date: Mar. 1, 1997, pp. 1–42.

* cited by examiner

Primary Examiner—Thomas B. Will
Assistant Examiner—Alexandra K Pechhold
(74) Attorney, Agent, or Firm—Ostrolenk, Faber, Gerb & Soffen, LLP (57) ABSTRACT A device for laying flexible pipes from the moon pool of a laying vessel comprises an inclinable tower arranged in and essentially a great height above the level of the moon pool, designed to place therein a certain length of pipe to be laid, and two members with clamping jaws mounted on moving carriages capable of travelling the height of the tower.

13 Claims, 14 Drawing Sheets

DEVICE AND METHOD FOR INSTALLING PIPES AT VERY GREAT DEPTHS

BACKGROUND OF THE INVENTION

The present invention relates to a device and to a method for laying tubular pipes underwater from a laying vessel.

Those skilled in the art make a distinction between flexible pipes and rigid pipes. Reference should be made to the American Petroleum Institute Specification API 17J for a definition of flexible pipes; in that flexible pipes have a relatively short (for example a few meters) minimum bend radius without plastic deformation, while rigid pipes, have a minimum bend radius without plastic deformation which is relatively large (for example several tens of meters). Furthermore, for the purposes of the description hereinbelow, the general term "flexible pipe" will be used to cover not only true flexible tubular pipes, but also flexible risers, umbilicals and the flexible cables that a laying vessel may have to lay.

FR 2 660 402 A in the name of the assignee here of discloses a device and method for laying flexible pipe from the moon pool of a laying vessel. The pipe is paid out from a storage basket and sent over a large circular-arc-shaped guide gutter (affectionately known as a "camembert") arranged at the top of a medium-height vertical derrick surmounting the moon pool and supporting two multi-track tensioners which grip the pipe and move it along constantly. This system is well suited to flexible pipes, that is ones which can tolerate a fairly pronounced curvature both in the storage basket and over the return gutter and on the intermediate portions of the catenary-curve-shaped path. By contrast, this system is ill suited to rigid pipes which do not tolerate such curvatures or for which such curvatures give rise to permanent deformations.

In the case of rigid pipes, there are four main types of laying method.

According to the so-called S-lay technique, the lengths of pipe are joined together horizontally on the deck of the vessel and are made to follow a S-shaped path with a very large radius of curvature so as to prevent any plastic deformation. The pipe leaves the ship at a very oblique angle, over an inclined chute known as a stinger. This technique is suited only to small and medium laying depths because otherwise the weight of the catenary of pipe already laid could bend and cause the plastic deformation of the pipe at the point where it leaves the stinger. This is why other techniques have had to be developed for greater depths of water.

The so-called reeled pipe system is illustrated, for example, in GB 2 025 566 A, in which the pipe, which has been welded together as a great length (in excess of 1 km for example) on the dockside and reeled with plastic deformation around a reel located on the laying vessel, is paid out from a reel, again with plastic deformation, and passes through a straightener before being taken up by the multi track tensioner of an inclinable laying ramp located at the stern of the vessel and the inclination of which is chosen to suit the laying depth.

The so-called G-lay technique is illustrated, for example, in GB 2 287 518 A in which the lengths of pipe are joined together horizontally on the deck of the vessel as in the S-lay technique; the pipe formed is sent toward the bow of the vessel then returned astern by a large wheel giving rise to plastic deformation of the pipe, after which this pipe passes through straighteners and a succession of multi-track tensioners, and then is launched into the water at a certain inclination which may be chosen according to the depth of water so as to avoid plastic deformation of the pipe in the submerged catenary.

A variation on this method is disclosed in GB 2 296 956 A, one of the embodiments of which is akin to the so-called S-lay methods and envisages despatching the pipe, previously assembled in lengths on the deck, over an arched aligner placed at the top of an inclinable ramp equipped with tensioners or clamping jaws; the two inflections that the pipe experiences lead to plastic deformations of the pipe and make the use of straighteners necessary.

To avoid the plastic deformations imposed on the pipe in the G-lay or rigid reeled-pipe methods, the so-called J-lay methods have been developed, being characterized by the fact that the lengths of pipe are assembled on a vertical or slightly inclined tower of the laying vessel, the lengths thus being welded together in the direction in which the pipe is to be laid, thus avoiding any plastic deformation at this stage, the assembled pipe then being submerged to a great depth, still without plastic deformation. One example is illustrated in U.S. Pat. No. 5,464,307 which shows a device for laying tubular pipes from the moon pool of a laying vessel, the device comprising an inclinable tower arranged in and essentially a great height above the level of the moon pool, designed to place therein a certain length of pipe to be laid, and means for clamping the length of pipe and moving it along. However, according to that patent, the upper tower is a pipe-alignment tower consisting of a lightweight structure because it has to withstand only the weight of one section of pipe; it is continued under the level of the moon pool by a substantial support tower on which the said movement means are provided, these consisting of a moving carriage holding the pipe at one of its arrester flanges. Any interventions that might be required on the device are made complicated by the fact that it is, to a large extent, submerged.

In a variation of the above method, disclosed by McDermott Marine Construction at the Offshore Technology Conference held in Houston (US) in 1994, the moving carriage holding the pipe can move along the upper tower. However, as in the other version of the method, the pipe is held on the carriage by an arrester flange resting against a support block belonging to the carriage. Such flanges are not necessarily present on all types of pipe. Even when a pipe comprises flanges that limit the buckling, known as buckle arresters, welded at various points, these cannot be used to support the entire weight of the pipe without strengthening their welds, which are usually fairly lightweight, because they have then to withstand high shear forces requiring a weld with good penetration; this results in a high cost of preparation of the pipe.

SUMMARY OF THE INVENTION

The object of the invention is to provide a new pipe-laying device and its associated method, which do not exhibit the drawbacks of the prior art and which are particularly well suited to the laying of rigid pipes at very great depths (for example down to about 3000 m, and a maximum load of the order of 600 tons), while at the same time also allowing flexible pipes to be laid.

The device of the invention is, on the whole, of the family of J-lay devices. It comprises an inclinable tower arranged in and essentially a great height above the level of the moon pool, designed to accommodate therein a certain length of pipe to be laid, and means for holding the said length of pipe and moving it along; the said means comprise at least two moving carriages capable of travelling the said height of the tower and able to accommodate members for holding the pipe. These holding members are very advantageously members with clamping jaws, known as clamps. The intention here is to make a distinction between a true (and static) clamping device such as this and a tracked linear tensioner (entailing movement at the same time as clamping). The latter generally has an overall length which is far greater (for example 15 m in the case of the hauling forces involved here) than that of a clamping device of the clamp type (for example 4 m long). By controlling the clamping of the clamps and the movement of one or other carriages along the tower, it is possible to use the device of the invention in a great many possible configurations, giving the device great versatility. The support tower is constructed so that it can withstand the weight of the entire pipe already submerged, which can be suspended therefrom. Although the clamping jaws are the holding device of choice, it is not precluded for special applications to use the mobile carriages to hold bearing blocks collaborating with holding flanges on the pipe. In addition, it is also advantageous for the tower to be able to accommodate tracked tensioner devices, thus allowing it to be used in many configurations for laying flexible pipes, the carriages then generally being relegated to the top of the tower.

The carriages are individually motorized and driven, for example, by a rack and pinion system along the inclinable tower so that they can move while at the same time supporting the entire weight of the submerged catenary of pipe.

The welding between successive lengths is advantageously performed at deck level, as are the operations of non-destructive inspection and of coating the pipe in the region of the welds. During these operations, the upper length is held by the upper carriage or by auxiliary members provided on the tower or on the device used to get the said length into place, while the lower carriage holds the submerged catenary.

Advantageously, with a view to increase the possible applications of the device of the invention, the tower at its upper end comprises a flexible pipe return wheel mounted on a bracket immobilized on the tower. This then is no longer a vast chute intended to guide a moderately flexible pipe, but a return wheel for a truly flexible pipe.

Advantageously, the wheel bracket is mounted so that it can be moved along the tower and can be immobilized at different heights which, as will be seen later on, gives further diversity to the applications.

In a known way, the tower preferably comprises a winch and a service cable, or better still, a double winch and two cables, making many manipulations easier.

Advantageously, the height of the tower above the moon pool is made up of at least two disassemblable sections. In certain instances, the sections can be disassembled and just one of them used on another vessel.

The height of the tower above the deck of the vessel is, for example, of the order of 50 m or more, allowing lengths of pipe made up of four assembled segments (usually 48.8 m) to be constructed. Depending on the capabilities of the ship and on its stability, this number of four lengths may be altered.

According to an important feature of the invention, the tower comprises a runway over its entire length above the moon pool, and is associated with a device for conveying a length of pipe onto the tower, this device comprising an elongate chassis equipped with wheels capable of running, on the one hand, along the deck of the laying vessel and, on the other hand, along the said runway along which it is hauled by the winched cables or other auxiliary devices.

Advantageously, the tower is associated with a retractable work table that can be inclined with it, and which is capable of supporting the weight of the submerged pipe.

At its lower part, the tower comprises a roller box mounted on an articulated or retractable chassis.

The method of the invention uses the foregoing device in various configurations.

Thus, for laying rigid pipes, the two carriages are used hand over hand to successively grip and lower the lengths of pipe. The upper carriage is the only carriage to move, travelling the entire length of the tower, with the entire length of the submerged pipe catenary as it descends, while the lower carriage is static at the bottom of the tower and is used only to hold the catenary of pipe when it is not being clamped in the upper carriage.

Advantageously, the two carriages are raised back up to the top of the tower to install a connection end fitting at the tail end of the line, or to install other accessories such as manifolds or buoyancy modules. The operations of fitting the connection end fitting and of holding the submerged pipe are made easier by the presence of a retractable work table over the moon pool around the pipe, this work table being designed to support the weight of the said submerged pipe which is temporarily attached thereto.

According to the invention, the wheel may be used at the full height of the tower or at mid height for laying a flexible pipe, if necessary using tensioners fitted to the lower part of the tower.

It is also possible to use just one part of the tower on a conventional vessel for laying a flexible pipe.

BRIEF DESCRIPTION OF THE DRAWINGS

Other features and advantages of the invention will become apparent from reading the following description of a number of embodiments, with reference to the appended drawings, in which.

DETAILED DESCRIPTION OF A PREFERRED EMBODIMENT

Figure 1:
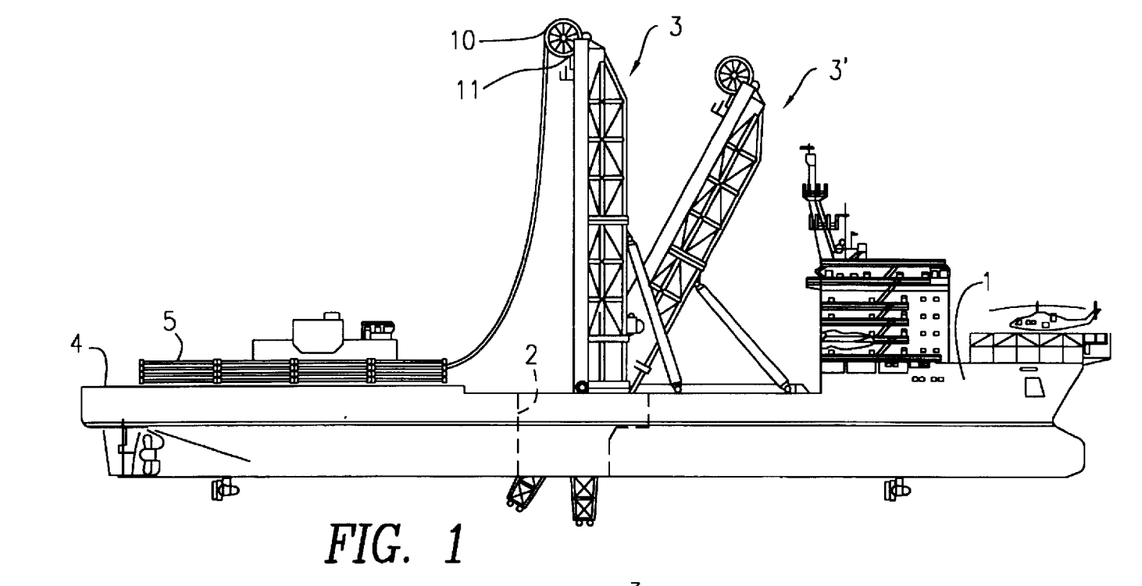
FIGS. 1 and 2 are respectively a side view and a view from above of a laying vessel equipped with the laying device according to the invention.
Figure 2:
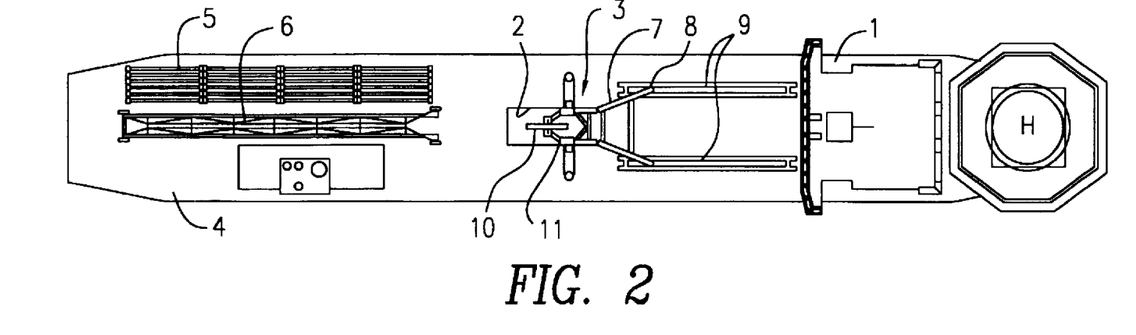

The laying vessel 1 comprises, towards its center, a moon pool 2 of fairly large dimensions, for example 14 m long to allow the lower part of a tower 3 erected mainly as superstructure and constituting the essential device of the invention to be housed and inclined therein. Assembled (for example in groups of four sections) lengths of pipe intended to be brought by a lifting chassis 6 into a vertical or inclined position on the tower 3 are stored on the aft deck 4. The tower 3 is articulated near its base and supported at the front of the tower (when considering the direction of the ship) by two articulated stays 7, the feet 8 of which slide in two parallel rails 9 arranged on the deck. Drive means, not depicted, allow the feet of the stays 7 to be moved and the tower 3 to be pivoted about its bottom articulation, so as to place it, as desired, in a purely vertical position or in an inclined position (for example inclined by up to 30°, bearing in mind the envisaged use for laying in deep waters), as depicted as 3'. At its upper end, the tower 3 has a wheel 10 rotating on an axle borne by a bracket 11 mounted so that it can be moved and immobilized along the tower 3.

Figure 3:
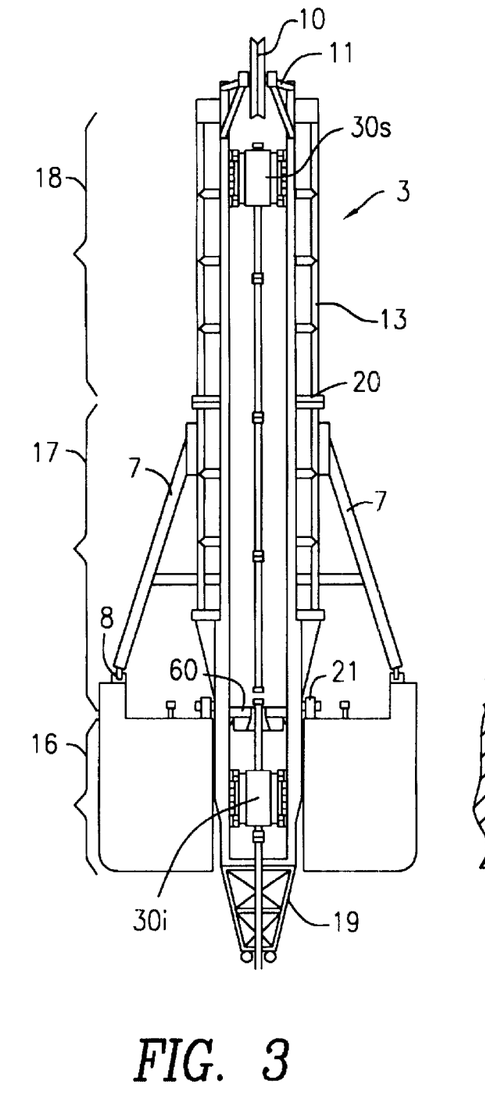
FIGS. 3 and 4 are views respectively from the front and from the side of the device of the invention, in its main version.
Figure 4:
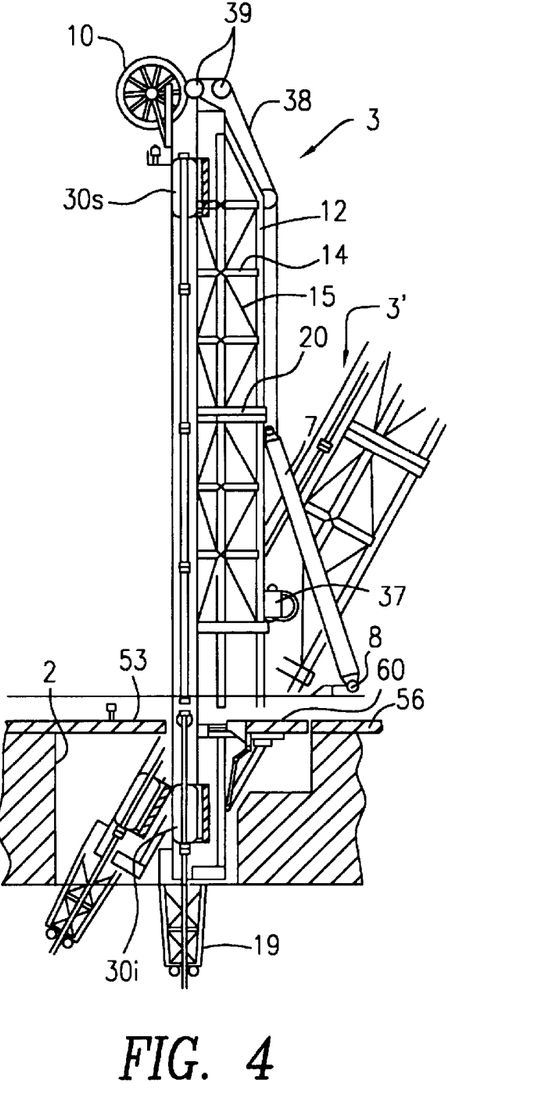

FIGS. 3 and 4 show the structure of the tower 3 in greater detail. This tower is formed of several sections each made up, for example, of a latticework structure comprising rear columns 12 and front columns 13, connected by horizontal bars 14 and oblique braces 15. Those skilled in the art are entirely familiar with these structures which need not be described in greater detail, and reference may be made to U.S. Pat. No. 5,464,307 and GB 2 025 566 A already mentioned. The tower preferably comprises three sections: a short lower section 16, for example 12 m tall, namely approximately the height of the moon pool 2, then two sections of the same length, these being respectively a central section 17 and an upper section 18, each being as much, for example, as 27 m long, and therefore giving a total tower height of 54 m in terms of superstructure.

Installed at the foot of the tower 3 is the roller box 19 which extends it downwards further by about a dozen meters, but which does not form part of the actual tower proper, and in particular does not comprise the ramp which will be described later on. The roller box 19 is used in the known way to control the excessive deviations in inclination of the submerged pipe. The sections 16, 17, 18 are attached at assembly flanges 20. The articulation 21 of the tower 3 is approximately in the region of the join between the two sections 16 and 17, that is to say approximately at the level of the upper deck.

Figure 5:
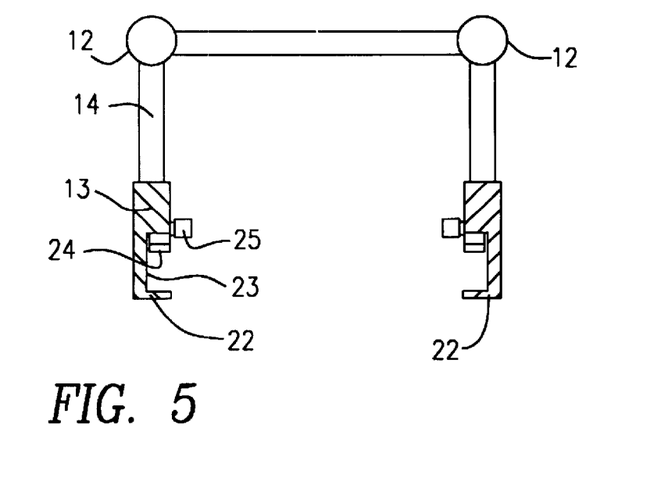
FIGS. 5, 6 and 7 are cross sections of, respectively, just the tower of the device, the tower and the clamping carriage, and the clamping carriage alone.

The tower has a cross section which overall is in the shape of a U or A, that is to with an opening formed on its rear face between two lateral legs. At the rear of the tower 3, the columns 13 are not tubular but formed, for example, of structural shapes of rectangular cross section comprising a rear runway face 22, a wide interior rectangular cavity 23 in a front face of which is housed a longitudinal rack 24. In addition, fixed to the interior side face of the structural shape 13 is a longitudinal rail 25 which faces towards the inside of the tower 3, the rail head having, for example, three running faces and a system for stiffening the structure being provided, as is familiar to those skilled in the art.

Figure 6:
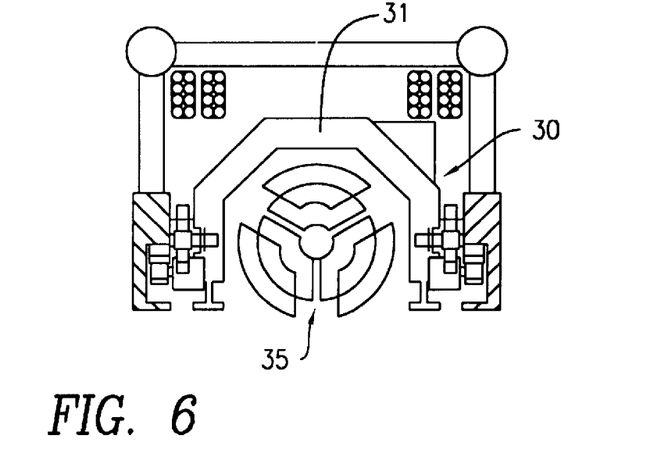
Figure 7:
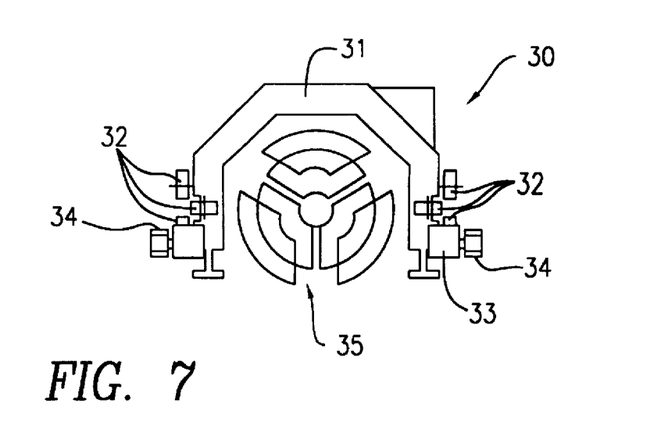

Two identical carriages 30 intended to support the holding members and move them along comprise a chassis 31 which overall is in the shape of a U which is open at the rear. On the legs of the U there are sets of three guide rollers 32 which are oriented in such a way as to bear against the three running faces of the rails 25. Two drive devices 33 drive a pinion 34 which engages in the rack 24 of the structural shapes 13.

To avoid having to stiffen the open structure of the tower excessively, it is possible to use carriages at least some of the guide rollers of which rest on running faces arranged in such a way that the bearing forces are directed towards the inside of the U-shaped or A-shaped structure.

The carriages 30 depicted bear a clamping device 35, for example of the clamping chuck type with three controllable jaws.

Figure 8:
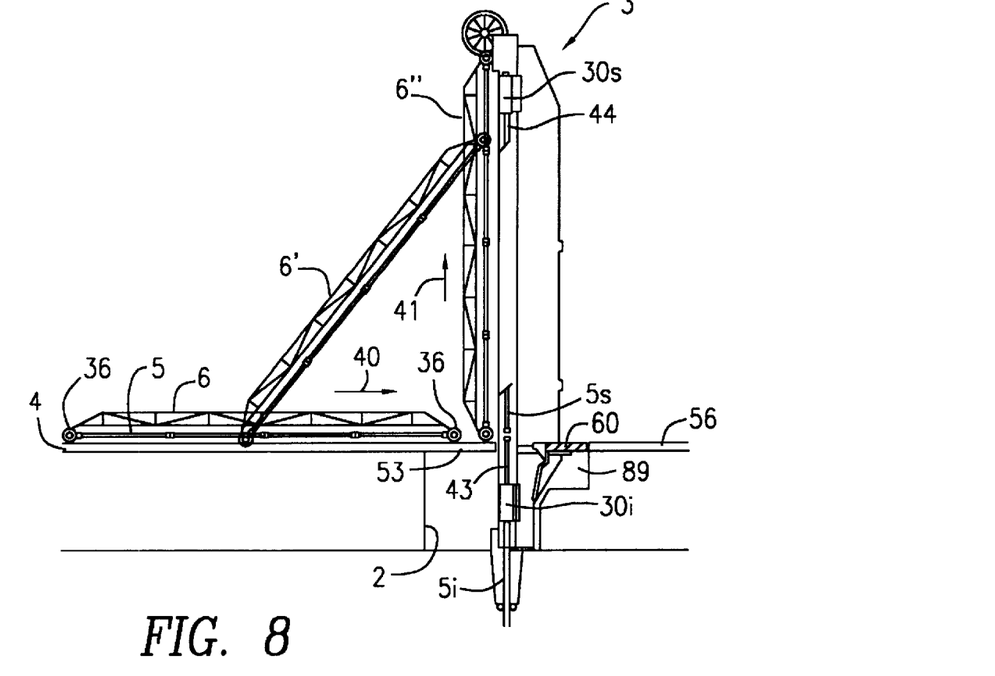
FIG. 8 is a side view of the device of the invention and of the device for conveying lengths of pipe onto the said device, FIG. 8' is a view similar to FIG. 8, with the tower in an inclined position.

FIG. 8 shows the placement, using the chassis 6, of a length 5 of pipes which have been preassembled on the deck 4 (FIG. 2). The chassis 6 is a lightweight bearing structure made of metal latticework, of a length approximately equal to the length to be placed and therefore also equal to the upper structure of the tower 3, and equipped with wheels 36 capable of running, on the one hand, along the deck 4 and, on the other hand, along the running faces 22 at the rear of the structural shapes 13 of the tower 3. Once a length 5 has been loaded onto the chassis 6, the latter is rolled (arrow 40) up to the foot of the tower 3, then hauled (arrow 41) along the front structural shapes thereof using auxiliary winches or other devices arranged on the tower 3 and not depicted (the big double winch represented by the reference 37, with its appropriate cables 38 returned over the top of the tower by pulleys 39 is used, in particular, for winching the abandonment flexible pipe). The chassis 6 therefore passes from a horizontal position into a vertical position 6" via some oblique positions 6'. FIG. 8 depicts the tower 3 in a vertical position, but the chassis 6 can be brought onto a tower in an inclined position 3' as shown in FIG. 8' in the same way.

Figure 9:
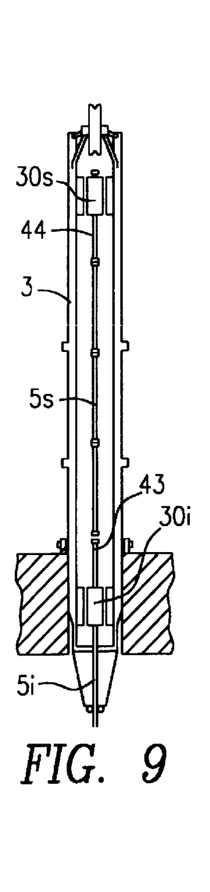
FIG. 9 is a front view of the device of the invention in a first stage of the method of putting a rigid pipe in place.
Figure 10:
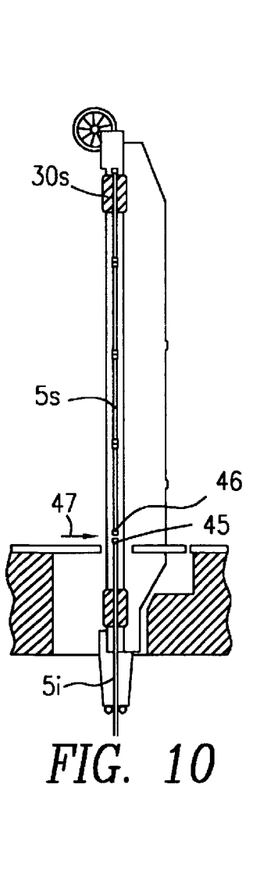
FIGS. 10, 11, 12 and 13 show, in side view, four successive steps in a method for putting a rigid pipe in place.

The two carriages 30, namely the upper carriage 30s and the lower carriage 30i, have been set in place as follows (FIGS. 8, 9 and 10): the lower carriage 30i is lowered into the lower section of the tower 3 and clamps and holds the upper end 43 of the last length 5i of pipe already laid; the upper carriage 30s has been brought up to the upper part of the tower 3 so as to be able to take, clamp and hold the upper end 44 of the new length 5s of pipe which has just been brought up by the chassis 6. In this phase then, the lower length 5i is held under the vessel by the lower clamping device 30i, and the upper length 5s is held above the length 5i by the upper clamping device 30s (or by any other auxiliary positioning and holding device). In this position, the ends facing each of the lengths 5i, 5s can be butted together and welded, and the continuity of the coating can be ensured. These operations are performed at the level of the arrow 47, that is to say at vessel deck level.

Figure 11:
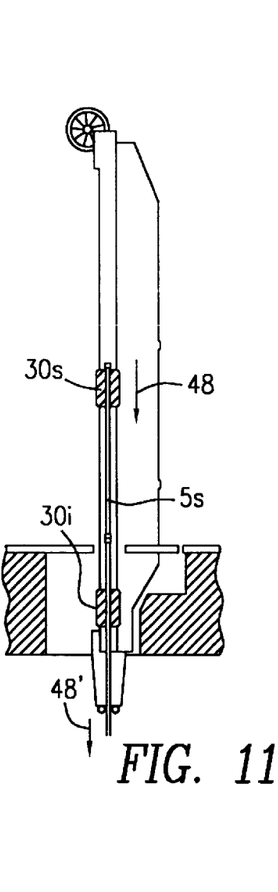
Figure 12:
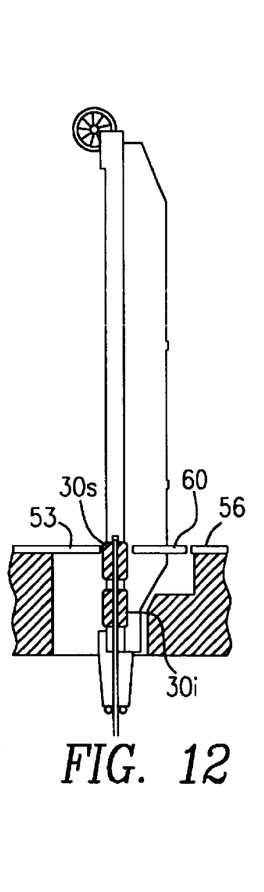
Figure 13:
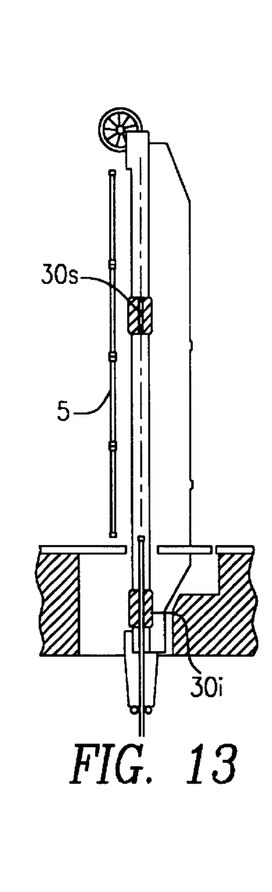

The sequence of operations is depicted in FIGS. 11, 12 and 13. Once the lengths 5i and 5s have been joined together, the lower clamping device 30i is opened, all the load of the laid pipe then being suspended from the upper clamping device 30s, which is still closed. The carriage 30s is moved downwards (arrow 48, FIG. 11) and this causes the entire pipe to be lowered (arrow 48') until the carriage 30s reaches its lowermost position (FIG. 12) just above the lower carriage 30i. The clamping members belonging to the carriage 30i are then closed and those belonging to the carriage 30s are opened. The laid pipe is then once again suspended from the lower carriage 30i, and the carriage 30s is free to move back up, open, to the top of the tower 3 (FIG. 13) to receive the next length 5 brought in by the device 6.

These steps are repeated until the entire pipe has been laid.

Special steps are provided for fitting a connection end fitting, which steps require the mobility of both carriages 30i and 30s and are illustrated in FIGS. 14 to 25.

Figure 14:
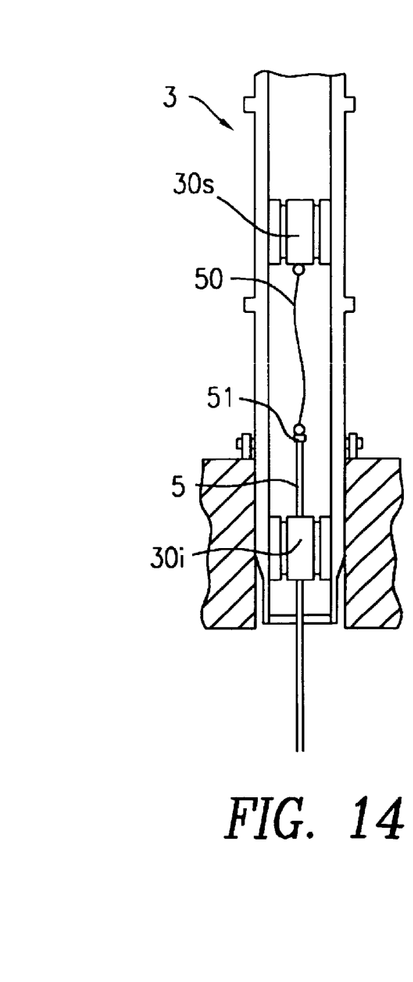
FIGS. 14 and 15, 16 and 17, 18 and 19, 20 and 21, 22 and 23, and 24 and 25 show, in front and side views respectively, six steps for installing a connection end fitting in the device of the invention.
Figure 15:
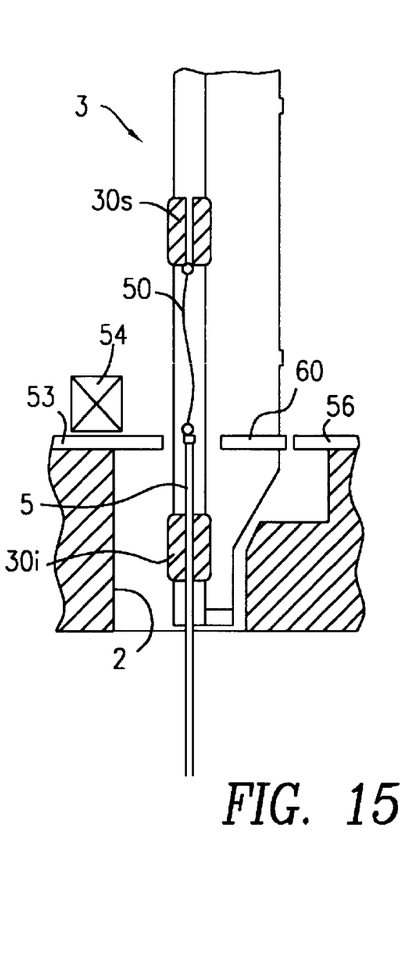

Once the last length 5, held by the lower carriage 30i, has been laid, the upper carriage 30s is raised back up by a few meters and a sling 50, capable of withstanding the tension of the entire line (for example 600 tons) is installed between the carriage 30s and the top 51 of the length 5 which was equipped with an attachment ring beforehand. These operations are made easier by the fact that once the upper carriage 30s has been moved back up, the hole 2 is closed by a sliding work table 53, on the one hand, and by a retractable table 60 with a central cutout that allows the pipe to pass through. The work table 53 is strong enough to withstand loads such as the connector 54, and the table 60 has to be able to withstand the weight of the entire suspended pipe, as will be seen later on.

Figure 16:
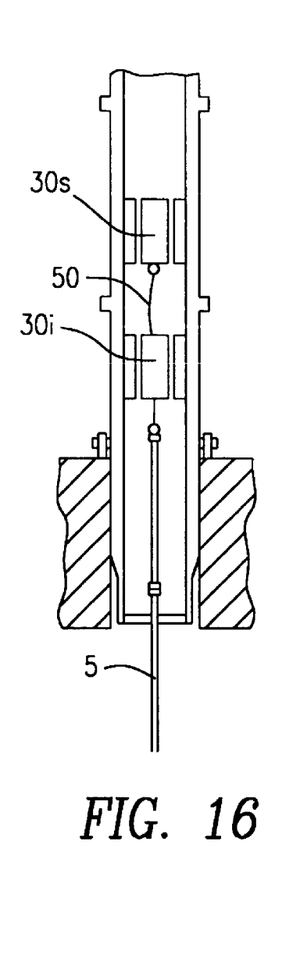
Figure 17:
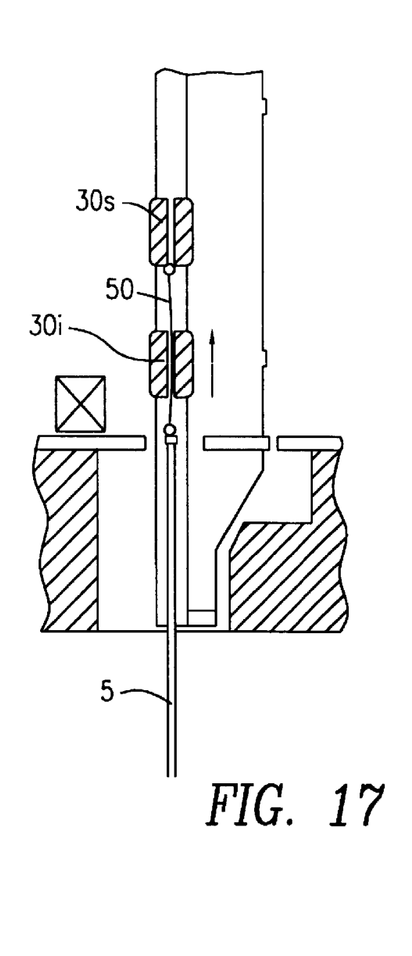
Figure 18:
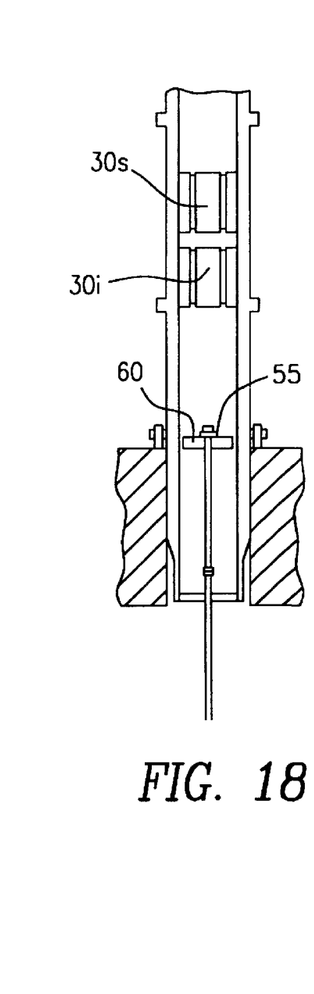
Figure 19:
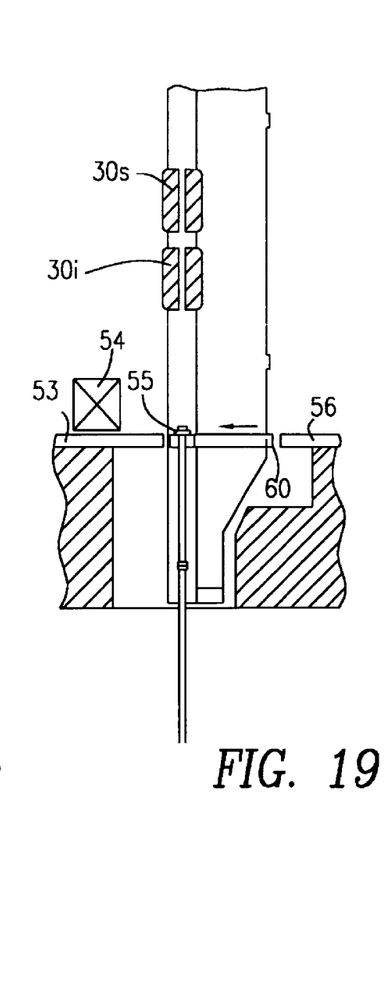

The clamp of the lower carriage 30i is then opened (which means that the entire weight of the suspended pipe passes to the sling 50 and is supported by the carriage 30s) and the carriage 30i rises up the tower 3 to almost join the upper carriage 30s (FIGS. 16 and 17).

Figure 20:
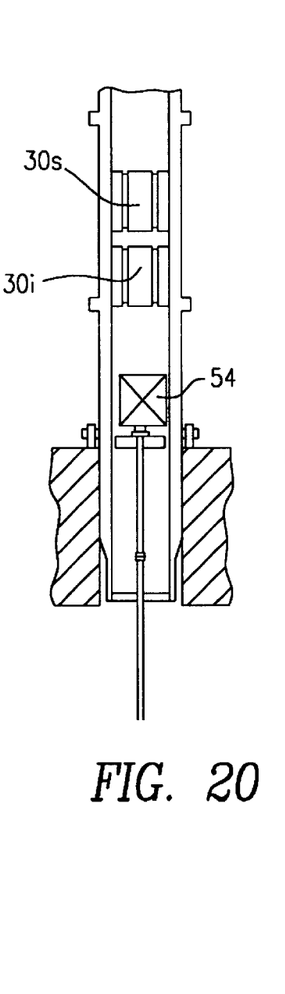
Figure 21:
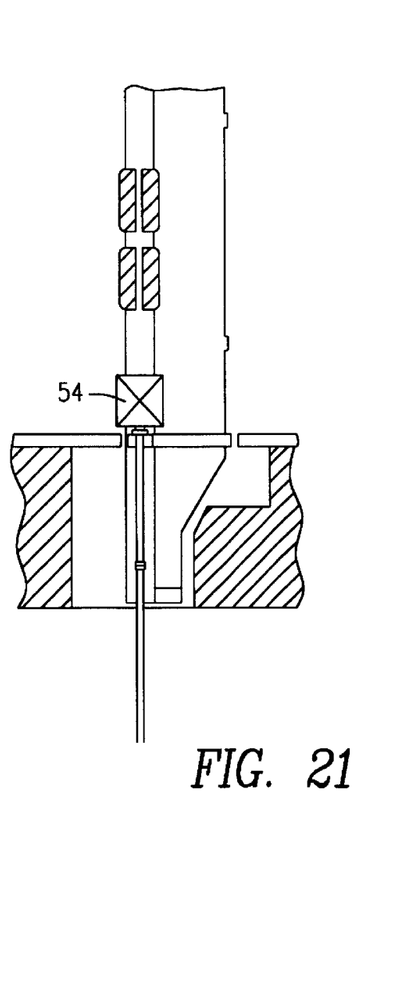
Figure 22:
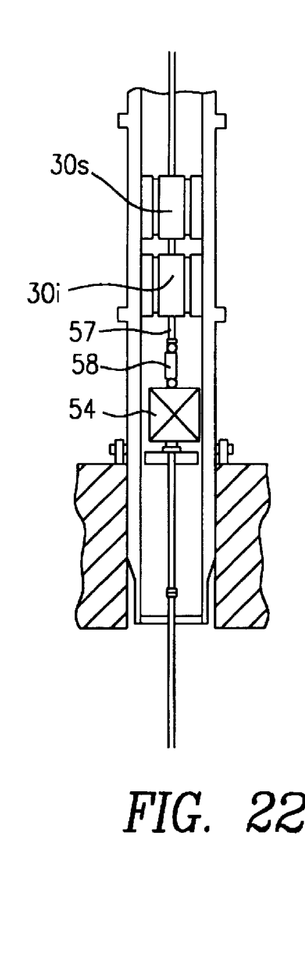
Figure 23:
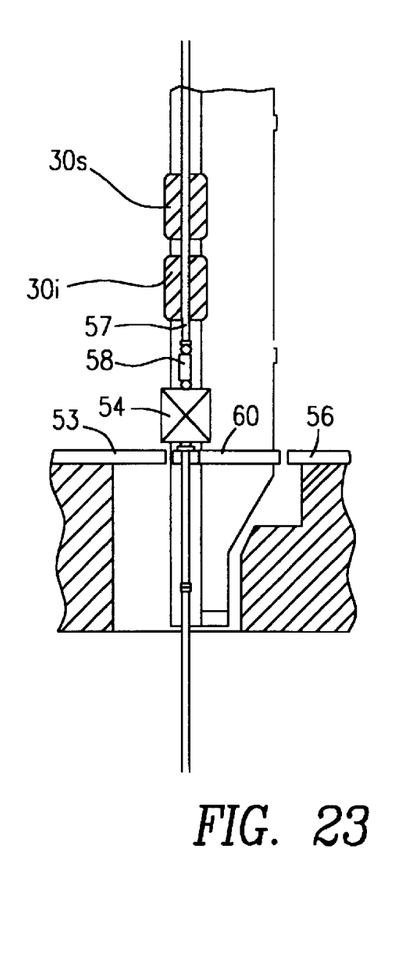
Figure 24:
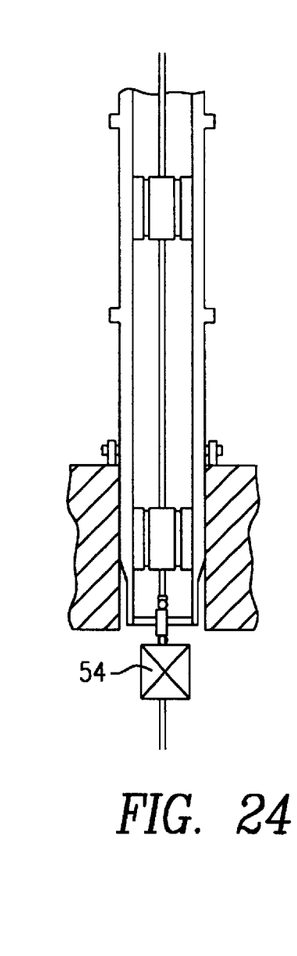
Figure 25:
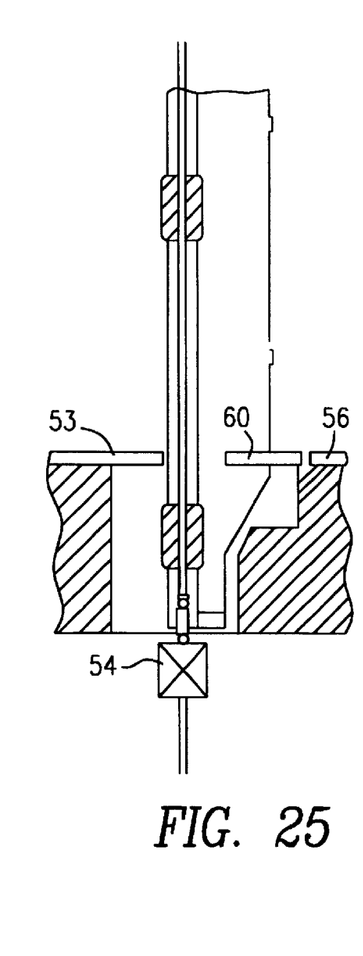

With the two carriages then in the raised position, the work table 53 and the table 60 which surrounds the end 51 of the pipe, the flange of which is held by a bearing collar 55 resting on the table 60 (FIGS. 18 and 19), can then be completely closed. The sling 50 and the pulley fitted to the top 51 can then be removed and the connection end fitting 54 installed (FIGS. 20 and 21).

The abandonment flexible pipe 57 (reference may be made to FR 2 660 403 of the assignee hereof on this subject) is then passed into the two carriages 30i and 30s (FIGS. 22 and 23) and then the automatic release device 58 is installed between the connector 54 and the abandonment flexible pipe 57. The clamp of the lower carriage 30i is then closed, this supporting the entire load of the suspended pipe.

The work tables 53 and 56 are then partially opened again (FIGS. 24 and 25) and the roller box 59 (which may be identical to the box 19 depicted in FIGS. 3 and 4) is opened. The lower carriage 30i can then come back down until the connector 54 passes through and then beyond the roller box which can then be closed again. The customary abandonment operations may be begun. A detailed embodiment of the table 60 will be described later on in conjunction with FIGS. 38 to 42.

Figure 26:
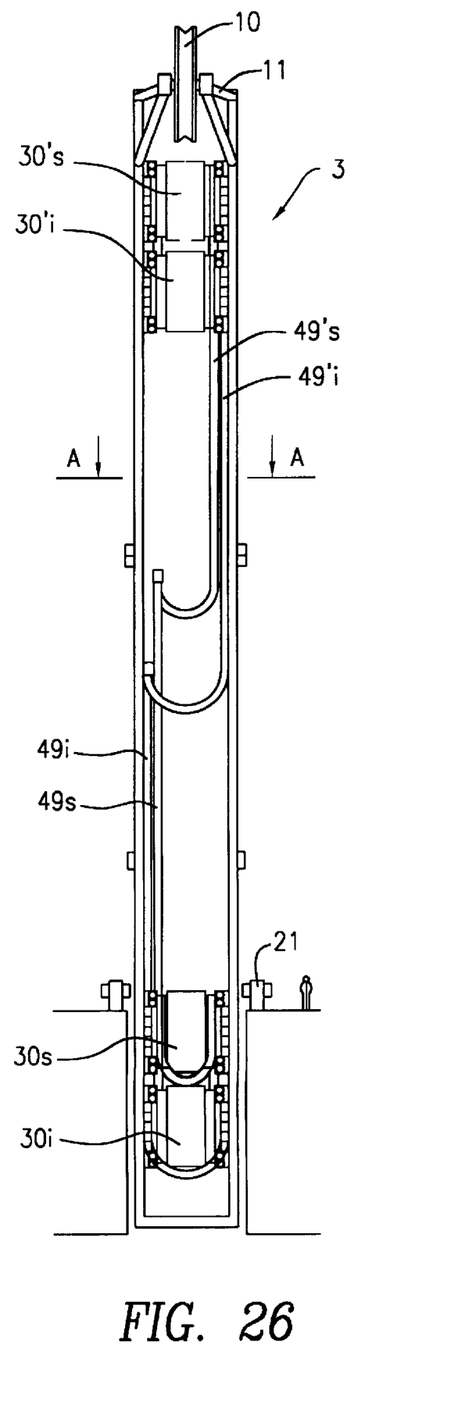
FIGS. 26 and 26a show, in rear view and in section A—A, one example of an arrangement of bundles of cables connecting the carriages, FIGS. 27, 27', 28, 29 and 30 show, in side views, five steps in a use of the device of the invention for fitting intermediate flexible connections or for deploying a pipe-following flexible pipe.
Figure 26A:
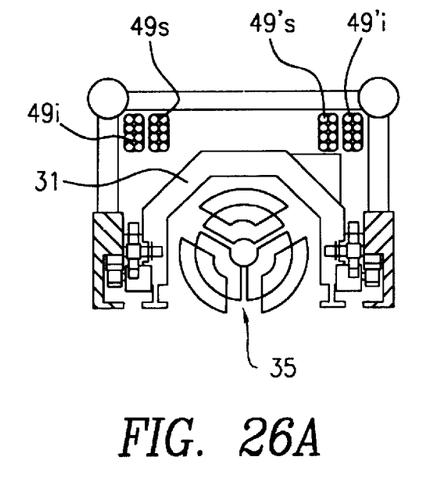
Figure 27:
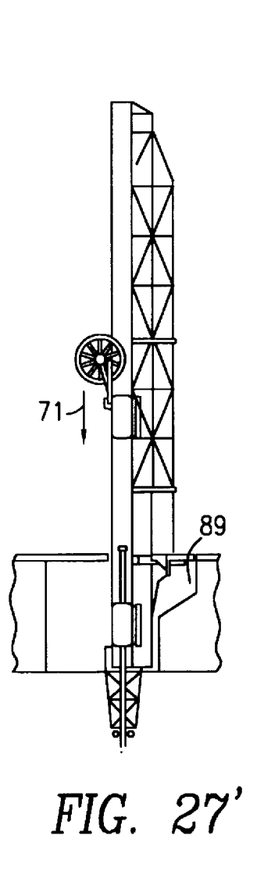
Figure 28:
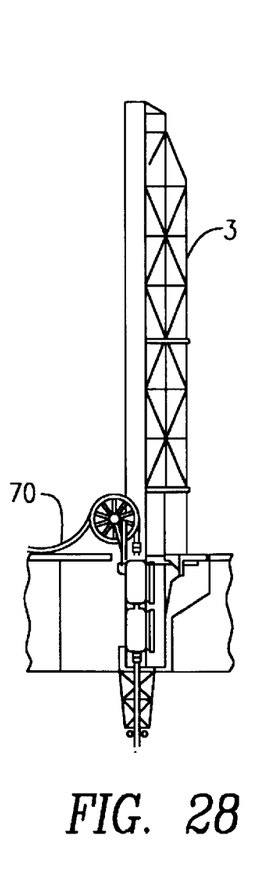
Figure 29:
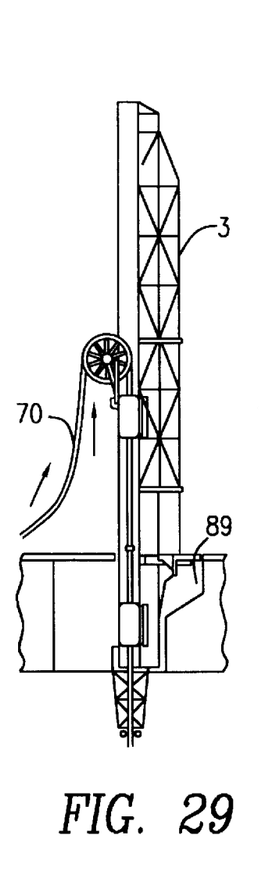
Figure 30:
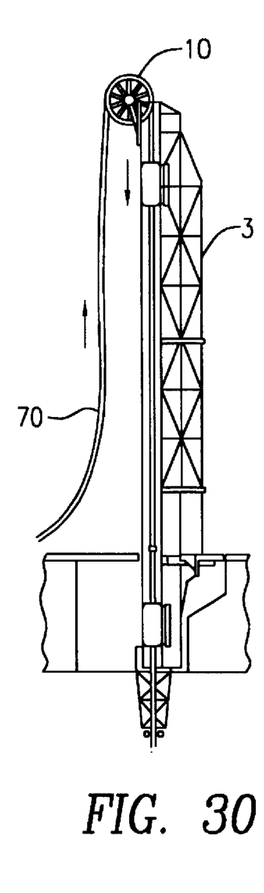

FIGS. 26 and 26a illustrate one embodiment of the connection of the lower 30i and upper 30s carriages. The respective flexible bundles 49i and 49s are suspended between a respective stationary connection point approximately mid-way up the column 3 and the underside of a respective carriage, either the lower carriage 30i or the upper carriage 30s. This same FIG. 26 depicts the two carriages 30i, 30s returned to a bottom position and connected by the bundles in positions 49i, 49s and the two carriages 30'i, 30's in a top position and connected by the bundles in a top position 49'i and 49's. The bundles, as shown by FIG. 26a, can easily find space in the structure of the tower 3, for example in the front interior corners of the tower.

FIGS. 27 to 30 illustrate one use of the tower 3 and of its accessories for placing an intermediate flexible connection pipe at the top of the line 5, which is held by the lower carriage 30i. The upper carriage 30s is placed at the top of the tower 3 and the wheel 10 with its bracket 11 are secured to the carriage 30s. The carriage 30s is then lowered (arrow 71, FIGS. 27 and 27') with the wheel 10 as far as a lower level (FIG. 28), which allows the flexible pipe 70 to pass over the wheel and allows the flexible pipe to be connected to the top of the pipe 5. The clamping means belonging to the upper carriage 30s being kept open and those of the lower carriage 30i being closed, the carriage 30s can ascend freely (FIG. 29) and bring the wheel 10 and the flexible pipe into the raised position (FIG. 30) in which the bracket of the wheel 10 is immobilized. The clamp of the upper carriage 30s is then closed and that of the lower carriage 30i is opened, which, by lowering the upper carriage 30s, allows a section of flexible pipe to be lowered; the clamp of the lower carriage 30i is then closed and that of the upper carriage 30s is then opened, which carriage can thus raise back up to the top of the tower 3. The operation can be repeated as many times as necessary to pay out the desired length of flexible pipe.

Figure 31:
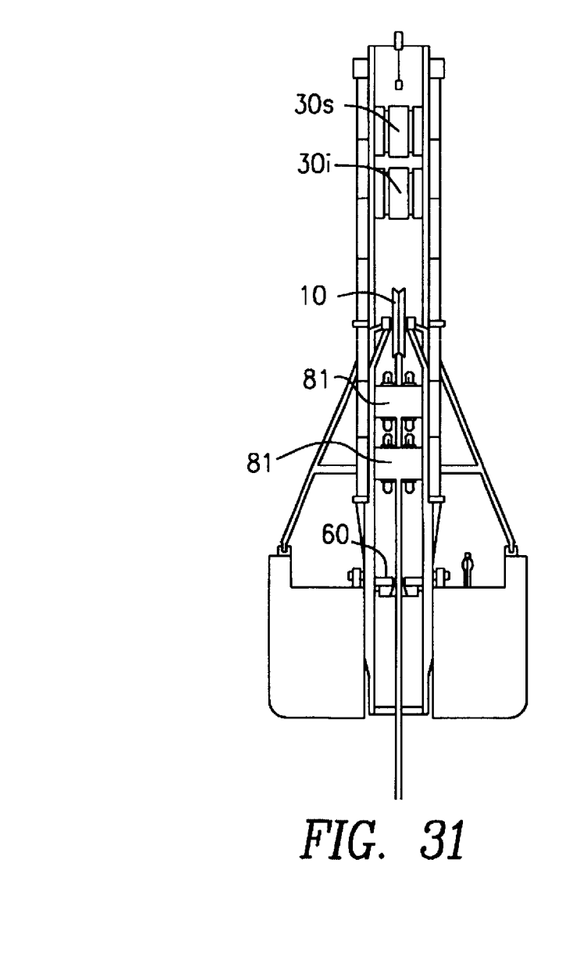
FIGS. 31 and 32 show, in a front view and a side view respectively, one use of the device of the invention for laying flexible pipe at very great depth.
Figure 32:
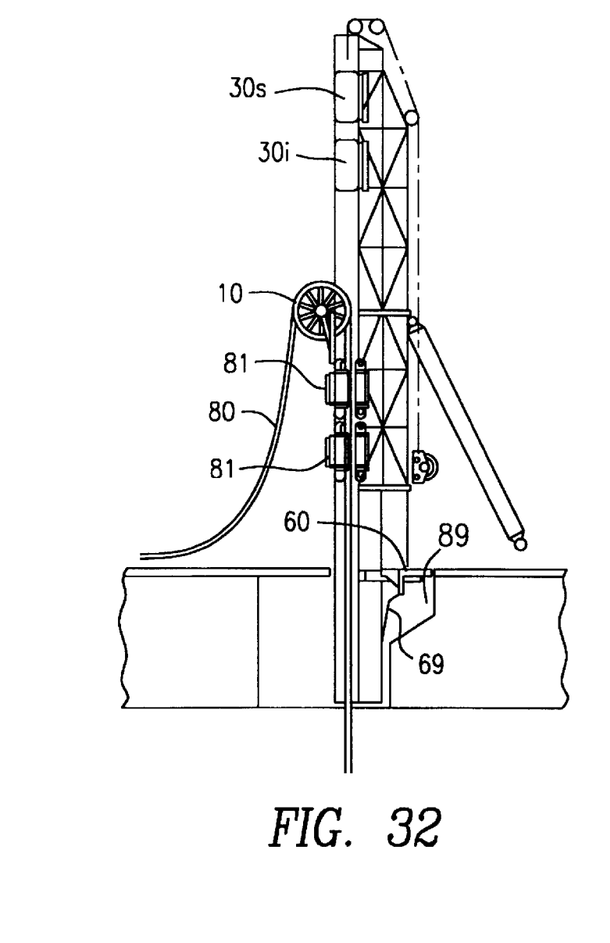

FIGS. 31 and 32 illustrate one additional possibility for the use of the tower of the invention for laying the flexible pipe 80 in deep water, the flexible pipe being paid out from a reel placed on the deck and not depicted. For this use, the wheel 10 is installed mid-way up the tower 3. The carriages 30i and 30s are relegated to the top of the tower 3, and two multi-track tensioning caterpillars 81 (for example three-track caterpillars sized so that they can be installed in the open part of the tower 3) are installed in a fixed position on the central section of the tower 3 to allow the flexible pipe 80 to be laid continuously (unlike the step-by-step laying using the clamping carriages 30s, 30i).

Figure 33:
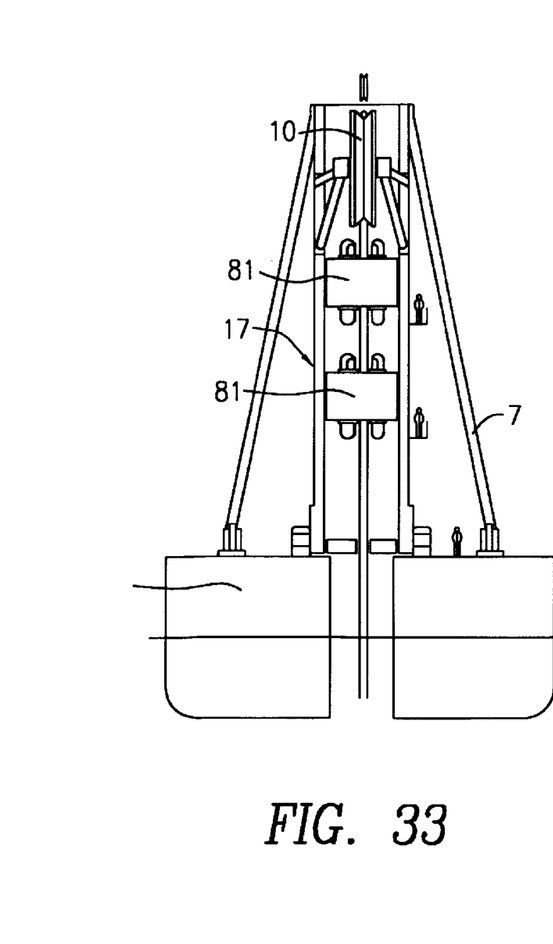
FIGS. 33 and 34 show, in a front view and a side view respectively, one use of a portion of the device of the invention for laying flexible pipes at moderate depth on a conventional vessel.
Figure 34:
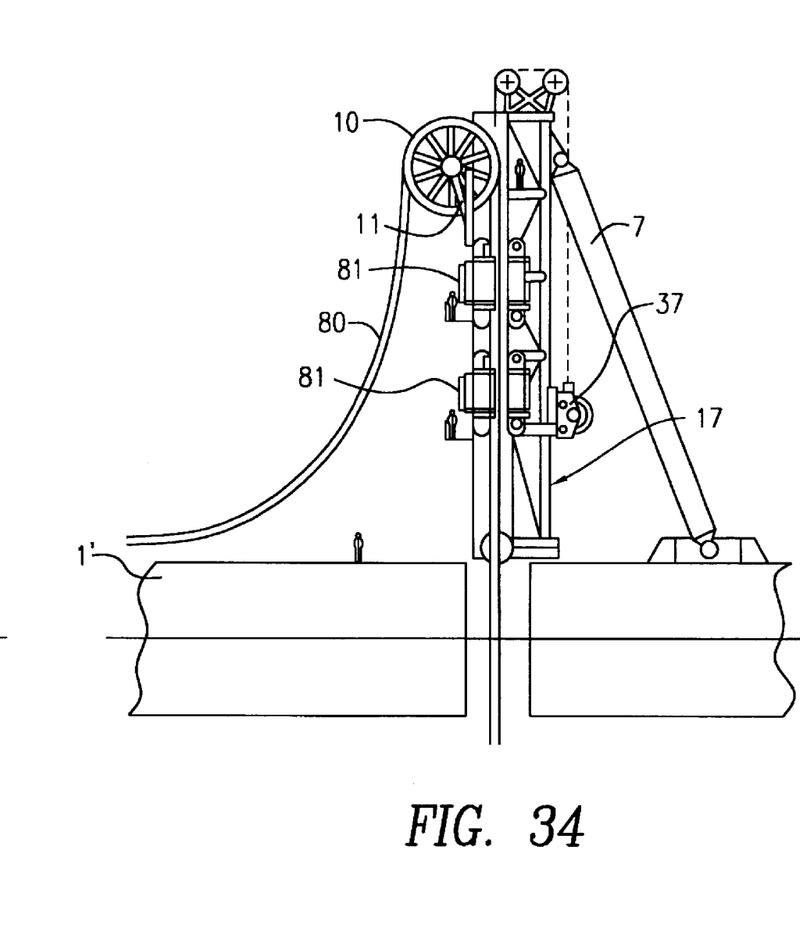

FIGS. 33 and 34 illustrate one use of part of the device of the invention on a conventional ship. In this case, only the central section 17 of the tower 3 is used and is mounted on the deck of a conventional vessel 1'. The wheel 10 is mounted on this section and tensioners 81 similar to those illustrated in FIGS. 31 and 32 are mounted on the section 17 so that the flexible pipe can be laid continuously.

Figure 35:
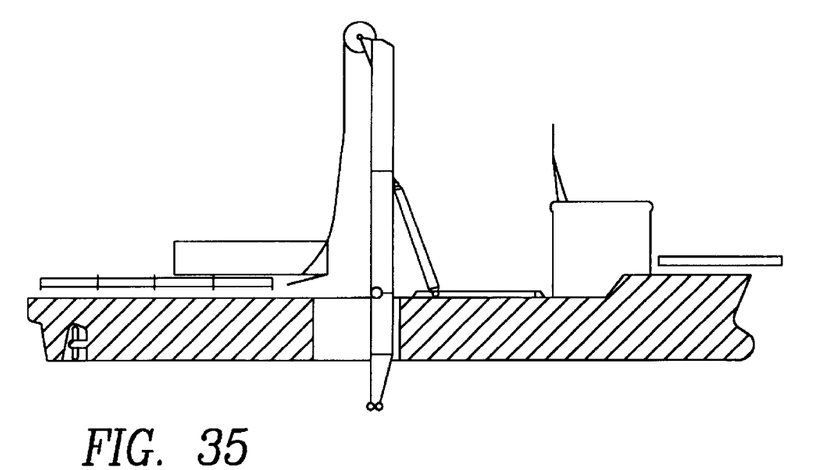
FIGS. 35, 36 and 37 are diagrams summarizing various possibilities of use of the device of the invention.
Figure 36:
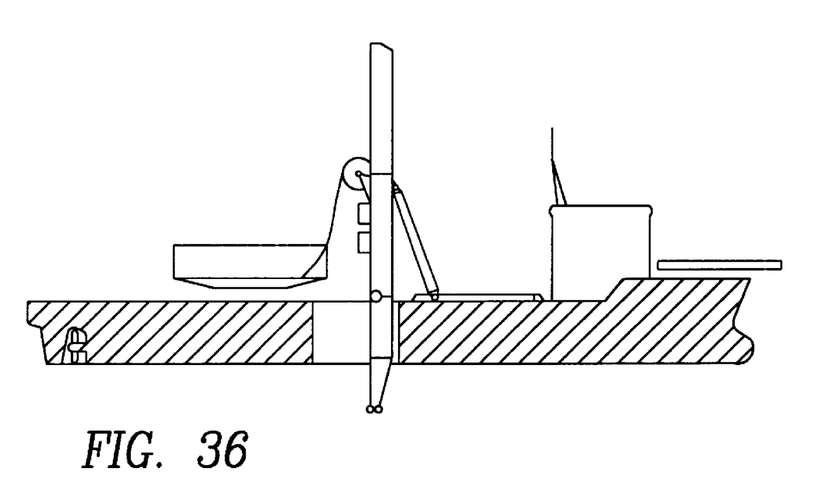
Figure 37:
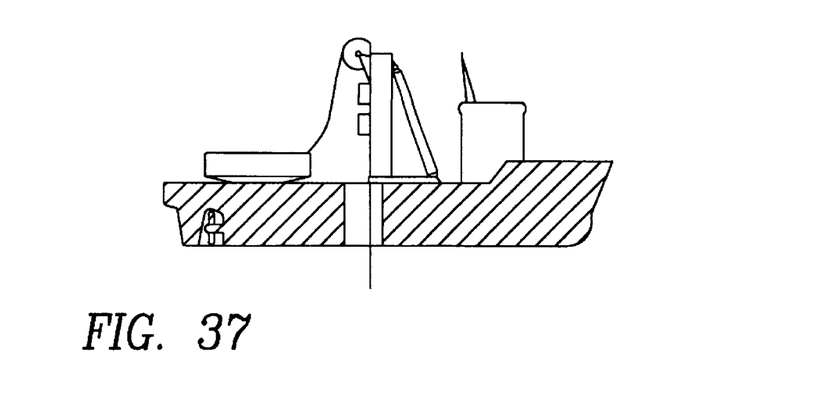
Figure 38:
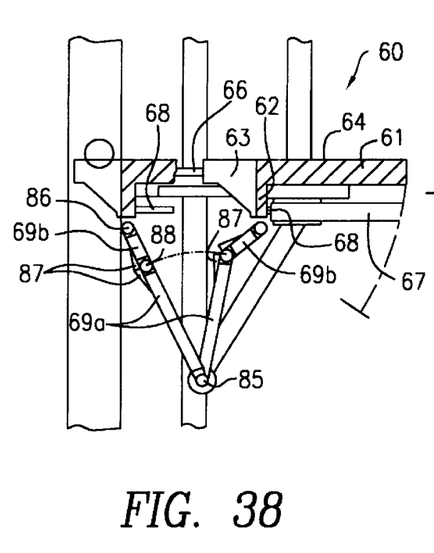
FIGS. 38 and 39 show details of the retractable table provided at the foot of the tower, in a lateral view and section and in a rear view, respectively.
Figure 39:
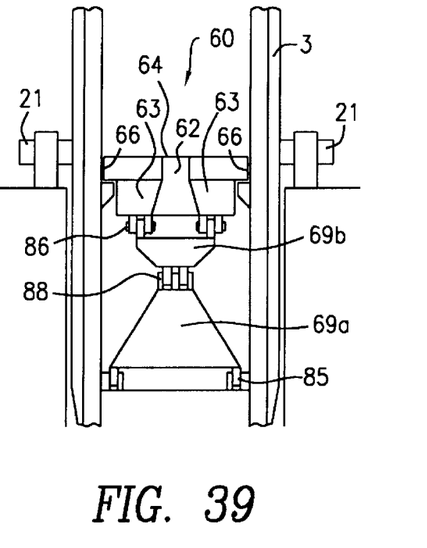
Figure 40:
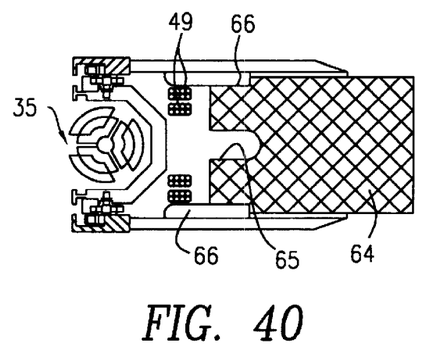
FIGS. 40, 41 and 42 show, viewed from above, the table in the open position with the passage of a carriage, in the open position, with the passage of a length of pipe and in a closed position with the passage of a length of pipe.
Figure 41:
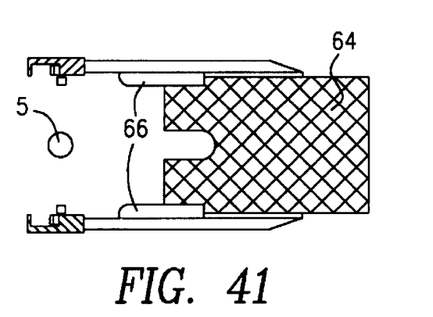
Figure 42:
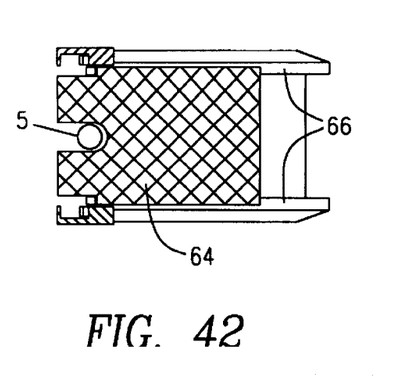

The main possibilities of use of the device of the invention are summarized in FIGS. 35 to 37. FIG. 35 shows a vessel for laying to a great depth, equipped with the complete tower, allowing rigid or flexible pipes to be laid (in the case of the version depicted, using the return wheel) by a clamping and step-by-step lowering system (with a step length of about 40 m) using the two clamping carriages of the invention. This system is intended for depths ranging to as much as 3000 m.

FIG. 36 shows a laying vessel for laying at a great depth, equipped with the complete tower but used at mid-height for paying out a flexible pipe using additional tensioners allowing continuous laying. This system is intended for depths ranging to as much as 1500 m.

FIG. 37 shows a conventional vessel on which just the lower part of the tower of the invention has been mounted, together with the wheel and the tensioners, for the continuous laying of a flexible pipe. Here too, this system is intended for depths ranging to as much as 1500 m.

FIGS. 38 to 42 describe in detail a preferred embodiment of a retractable and inclinable table 60 associated with sliding work tables 53 and 56 arranged at the rear and at the front of the moon pool 2. The table 60, dependent on the tower 3 and inclinable with it, consists of a sliding structure made up of a robust plate 61, to the rear of which a rim 62 supports two bracket-shaped extensions 63, the whole thing being covered by a working surface 64 so as to form a working area which, at the rear, has a cut-out 65 for the passage of the pipe 5. The table 60 slides on lateral slideways secured to the structure of the tower 3. A ram 67, the cylinder of which is secured to the structure of the tower 3, has its rod 68 attached to the rim 62 of the plate of the table and can therefore move the table from a retracted position to a closed position and vice versa. In the retracted or open position (FIGS. 40 and 41) the table leaves enough space for, in particular, the carriages 30 (FIG. 40) or the connector 54 (as was seen in FIG. 23) or, a fortiori, the pipe 5 (FIG. 41) to pass. In its closed position (FIG. 42) the table just leaves space for the pipe 5 to pass by virtue of the cut-out 65. Given the fact that along the sides of the tower 3, the presence of the guide rails and the passage of the carriages prevents the slideways 66 from extending fairly far backwards as far as the pipe, and that the closed table is cantilevered in this region, an articulated shore leg 69 has been provided to support the rim 62. The shore leg 69 consists of two sections 69a and 69b articulated together at 88 and articulated respectively to a lower axle 85 connected to the tower 3 and an upper axle 86 connected to the rim 62. Locking sectors 87 are provided on the articulation 88 between the sections 69a and 69b to lock the leg 69 straight when the table is in the closed position; the shore leg 69 makes sure that the table is strong enough to withstand the load of the pipe suspended in the cantilevered region in the way explained in conjunction with Figures et seq.

As shown by FIG. 8', the table accompanies the inclination of the tower 3. To allow this inclination, the moon pool 2 may be enlarged by a clearance volume 89. When the table 60 is open and the tower 3 is vertical the table 60 covers this volume; when the table 60 is closed (FIG. 23) and/or when the tower is inclined (FIG. 8'), the auxiliary work table 56 is pulled across to cover the volume 89.

What is claimed is:

1. A device for laying a tubular pipe from a pipe laying vessel, the device comprising the vessel having a deck;

a moon pool extending through the vessel deck;

an inclinable tower at the deck and inclined along a length of the tower up from the moon pool, the tower being adapted to support a length of pipe to be laid, the pipe supported along the length of the tower;

at least two moving carriages on the tower spaced apart along the length of the tower and each carriage capable of movement along an entire length of the tower, and a respective pipe holding member at each of the at least two moving carriages for holding pipe.

2. The device of claim 1, wherein the tower has an upper end above the deck, a bracket toward the upper end of the tower and a flexible return wheel mounted on the bracket over which pipe is guided.

3. The device of claim 2, wherein the bracket is moveable and securable selectively at different positions along the length of the tower.

4. The device of claim 1, further comprising a runway along the length of the tower; a device for conveying a length of pipe onto the tower along the runway thereof.

5. The device of claim 4, wherein the device for conveying the length of pipe comprises an elongate chassis for transporting pipe, and wheels on the chassis capable of running along the deck and also of running along the runway for enabling a length of pipe on the deck to be raised on the tower.

6. The device of claim 1, wherein each pipe holding member comprises a clamping jaw for clamping pipe.

7. The device of claim 1, further comprising an additional tensioner device on the tower for tensioning pipe extending along the tower.

8. The device of claim 1, wherein the tower is comprised of at least two disassembleable sections, one above the other along the length of the tower.

9. The device of claim 1, further comprising a table at the vessel, the table being retractable to selectively cover and uncover the moon pool, the table being inclinable along with the tower and the table being adapted to support the weight of submerged pipe extending from the tower through the moon pool.

10. A method of laying pipe through a moon pool of a vessel, wherein the vessel has a deck with a moon pool therein which communicates beneath the vessel and the vessel has an inclinable tower at the moon pool for receiving pipe on the tower which pipe is to lowered through the moon pool into the water, and the tower further having at least first and second clamping carriages thereon, one above the other, and each of the clamping carriages being movable up and down along the tower, the method comprising the clamping carriages being selectively and alternately displaceable along the tower to clamp to the pipe, in hand over hand successive gripping for lowering lengths of relatively rigid pipe along the tower and through the moon pool.

11. The method of claim 10 wherein the pipe being laid is in pipe sections, the method further comprising raising the first and second carriages toward the top of the tower for installing a connection end fitting on the tail end of the pipe section being lowered hand over hand by the carriages on the tower.

12. The method of claim 10, wherein the tower has a wheel which is movable along the height of the tower;

the method further comprising passing the pipeline around the wheel on the tower and adjusting the height of the wheel along the tower to a particular pipeline.

13. The method of claim 10, further comprising applying a pipe section to be laid to a carriage on the deck of the vessel, raising the carriage up the tower to incline the pipe to the incline of the tower, clamping the pipe at the tower and then lowering the section of the pipe hand over hand through the moon pool.

\* \* \* \* \*